United States Patent [19]

Izumi et al.

[11] 3,932,274

[45] Jan. 13, 1976

[54] METHOD FOR ELIMINATING METALS FROM A SOLUTION CONTAINING A VERY SLIGHT AMOUNT OF THE METALS

[75] Inventors: Gaku Izumi; Tetsuo Kimura; Katsuyoshi Mori; Michiko Koizumi, all of Sendai, Japan

[73] Assignee: Director-General of the Agency of Industrial Science and Technology, Tokyo, Japan

[22] Filed: June 11, 1974

[21] Appl. No.: 478,244

Related U.S. Application Data

[63] Continuation of Ser. No. 283,797, Aug. 25, 1972, abandoned.

[30] Foreign Application Priority Data

Aug. 27, 1971  Japan.................................. 46-66195

[52] U.S. Cl. ..................... 210/44; 210/54; 210/58; 252/61

[51] Int. Cl.² .......................................... C02B 1/18

[58] Field of Search ................. 210/38, 44, 54, 58; 209/166, 167; 252/180, 61

[56] References Cited

UNITED STATES PATENTS

| | | | |
|---|---|---|---|
| 2,532,391 | 12/1950 | Bersworth | 210/58 X |
| 2,712,544 | 7/1955 | Bersworth | 210/58 X |
| 3,054,746 | 9/1962 | Gaden et al. | 210/44 |
| 3,116,105 | 12/1963 | Kerst | 252/180 X |
| 3,238,127 | 3/1966 | Sebba | 210/44 |
| 3,363,758 | 1/1968 | Cronberg et al. | 209/166 |
| 3,459,649 | 8/1969 | Muller et al. | 209/166 |
| 3,506,576 | 4/1970 | Teumac | 252/180 X |

*Primary Examiner*—Thomas G. Wyse
*Attorney, Agent, or Firm*—William J. Daniel

[57] ABSTRACT

Metal ions are effectively eliminated from aqueous solutions containing the same by treating the solution with a metal sequestering agent which is a condensation product of a higher alkyl halide with a polyamine.

4 Claims, No Drawings

METHOD FOR ELIMINATING METALS FROM A SOLUTION CONTAINING A VERY SLIGHT AMOUNT OF THE METALS

This is a continuation of Ser. No. 283,797, filed Aug. 25, 1972, now abandoned.

BACKGROUND OF THE INVENTION

1. Field of the Invention

This invention relates to a method for removing metal ions present in small amounts in aqueous solutions by means of a novel metal sequestering agent having a strong binding force with metal ions, especially with ions of heavy metals.

2. Summary of the Prior Art

Waste water emanating directly from metal ore mines, or mingled in neighboring streams, as well as waste water from industrial plants, especially from chemical plants, often contain a variey of dissolved metal ions, of which ions of heavy metals are especially known to be detrimental to humans and animals. Thus, removal of such ions from waste water before its discharge into a river, lake, or sewer can be desirable or even required by government regulation. It is known in the art to eliminate metal ions in contaminated waste water from mines or plants by treatment with a metal sequestering agent such as a condensed phosphate or ethylenediaminetetracetates which have the capacity to bind metal ions to form an inert complex compound in which the harmful action inherent in heavy metal ions is suppressed.

However, heretofore known metal sequestering agents such as condensed phosphates and ethylenediaminetetracetates are expensive because of the complexity of the process used for their production and hence are rarely used in large amounts for economical reasons. For the purification of contaminated waste water from mines and plants, the development of a new type metal sequestering agent which can be produced at a lower cost on an industrial scale and has a strong metal sequestering activity is a keenly felt need in the art.

Therefore, it is a prime object of this invention to provide a method for eliminating metal ions almost completely from solutions, especially aqueous solutions, containing a very slight amount of such metal ions.

It is another object of this invention to provide a new metal sequestering agent which is suitable for use in said method and can be prepared cheaply on an industrial scale.

These and other objects of this invention will become apparent as the description proceeds.

GENERAL DESCRIPTION OF THE INVENTION

In accordance with this invention, metal ions contained in a very slight amount in a solution can be eliminated almost completely by treating the solution with a new metal sequestering agent comprising a condensation product of a higher alkyl halide with a polyamine.

One of the starting materials for the metal sequestering agent used in the method of this invention is a higher alkyl halide, that is, a halogen derivative of compounds having 8-24 carbon atoms such as higher saturated hydrocarbons, higher olefins and higher alcohols which are produced in a large scale as petrochemical products. These higher alkyl halides can be used alone or in a mixture of two or more.

Taking into consideration the requirements for strong metal sequestering activity, easy separation of the agent from the waste water, the use of an alkyl halide having more than 9 carbon atoms is advantageous in the practice of this invention.

Another starting material for the metal sequestering agent is a polyamine having at least two amino groups in its molecule. Illustrative of such polyamines are, for example, ethylenediamine, tetramethylenediamine, pentamethylenediamine and like diamines, and polyalkylenepolyamines, such as diethylenetriamine. These polyamines are known compounds and are comercially available.

The reaction between the alkyl halide and the polyamine is conducted at room temperature, or more preferably at an elevated temperature above 100°C. In this reaction, an adequate solvent such as xylene may be used to make the operation smooth.

The reaction product of the higher alkyl halide and the polyamine is a viscous brown semi-solid substance having an average molecular weight of 200–1000 which predominantly contains a higher alkylated polyamine of the general formula:

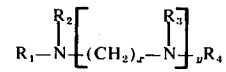

wherein $R_1$ is an alkyl, hydroxyalkyl or alkoxyalkyl group having 8–24 carbon atoms, $R_2$ is hydrogen, the same as $R_1$, or alternatively the grouping $+(CH_2)-N(R_3)+_y R_4$, $R_3$ and $R_4$ each are hydrogen or the same as $R_1$, $x$ is an integer of 1–4 and $y$ is an integer of 1–3. This reaction product can be used directly or, prior to actual use, subjected to distillation or the like purification treatment to isolate the predominant component. If necessary, the reaction product may be used as the sequestering agent in the form of an acid addition salt with an inorganic or organic acid, such as hydrochloric acid, or acetic acid.

The metal sequestering agents of this invention exhibit excellent metal sequestering activity for metal ions, especially heavy metal ions, dissolved in waste water. Examples of such heavy metal ions include ions of such metals as copper, zinc, cadmium, mercury, iron, nickel, cobalt, manganese, chromium and the like. It is of course possible to apply the metal sequestering agent of this invention to solutions other than waste water from mines and plants for eliminating metal ions therefrom.

These agents are used preferably in an amount such that at least 2 mols of the alkyl-substituted-polyamine present as the active component are provided for each atom of the metal to be removed.

After the treatment for eliminating the metal ions, separation of the used metal sequestering agent from the waste water is easily carried out by taking advantage of a preferential adsorbtion of the agent for other materials. The most preferred technique to this end involves introducing air into the waste water to form bubbles, collecting the metal sequestering agent complex by its adsorption to the surface of the bubbles and floating the bubbles away with the metal agent complex being kept around the surface of the bubbles.

According to the method of this invention, heavy metal ions contained in an aqueous solution in an order of only a few milligrams can be eliminated almost completely.

DESCRIPTION OF PREFERRED EMBODIMENT

This invention will be explained in more detail by way of examples but it is to be noted that these examples are given only for the purpose of illustration and are not intended to limit the scope of this invention.

Example 1

To 4.1 g. of dodecyl chloride placed in a 100 ml. egg apple-shaped flask equipped with a reflux condenser were added 4.8 g. of ethylenediamine and 40 ml. of ethanol. The mixture was boiled for 3 hours with nitrogen being slowly introduced thereinto to effect reaction. After removal of ethanol by distillation, water and ether were added to the reaction mixture and extraction of the product with the ether was then conducted to obtain 4 g. of the desired metal sequestering agent aimed at. 0.04 g. of this agent was added in the form of its acetate addition salt to 1 liter of an aqueous solution of cupric acetate containing copper ions in an amount of 10 ppm. From the bottom of the container air was blown in the form of very small bubbles into the solution at a rate of 300 ml./min. By this treatment, 98 percent of the copper originally present was recovered through adsorption to the bubbles after 10 minutes.

Example 2

To 4.1 g. of dedcyl chloride were added 8.3 g. of diethylenetriamine and the mixture was reacted and purified as described in Example 1 to obtain 4 g. of a metal sequestering agent which was readily soluble in water. 0.08 g. of this agent was added to 1 liter of an aqueous solution of zinc sulfate containing zinc ions in an amount of 20 ppm. Air was bubbled from the bottom of container as described in Example 1. After 16 minutes, 99 percent of the zinc originally present was recovered through adsorption to the bubbles.

Example 3

To 5.8 g. of octadecyl chloride were added 4.8 g. of ethylenediamine and the mixture was processed as described in Example 1 to obtain 5 g. of a metal sequestering agent. The acetate addition salt of this agent was soluble in water. 0.05 g. of this acetate was added to 1 liter of an aqueous solution of copper sulfate containing copper ions in an amount of 8 ppm. Air was bubbled into the solution for 13 minutes as described in Example 1 to recover 97 percent of the copper originally present.

What is claimed is:

1. A method for eliminating heavy metal ions from a solution containing a minute amount of heavy metal ions comprising treating said solution with a metal sequestering agent consisting essentially of a higher alkylated polyamine of the general formula:

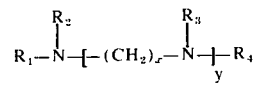

wherein:
R$_1$ is an alkyl, hydroxyalkyl, or alkoxyalkyl group having about 8–24 carbon atoms,
R$_2$ is a hydrogen atom, the same as R$_1$, or a $+(CH_2)_x-N(R_3)\!+_y\!R_4$ group,
R$_3$ and R$_4$ each are a hydrogen atom or the same as R$_1$
$x$ is an integer from 1 to 4 and
$y$ is an integer from 1 to 3, or a water-soluble addition salt of said polyamine with an organic or inorganic acid;
blowing air into the treated solution to form bubbles and separating the metal sequestering agent from the solution through adsorption of said bubbles.

2. The method of claim 1 wherein said condensation product is an alkyl-, alkoxyalkyl-, or hydroxyalkyl-substituted polyamine, said substituent having about 8–24 carbon atoms.

3. The method of claim 1 wherein said polyamine is a polymethylene diamine or a polyalkylene polyamine.

4. The method of claim 1 wherein said solution is treated with said agent in an amount equal to at least about 2 moles of such polyamine for each atomic weight of the metallic ions to be removed.

* * * * *